No. 681,553. Patented Aug. 27, 1901.
A. JACQUOT.
MEASURING INSTRUMENT FOR FITTING HORSE COLLARS.
(Application filed Jan. 18, 1901.)
(No Model.)
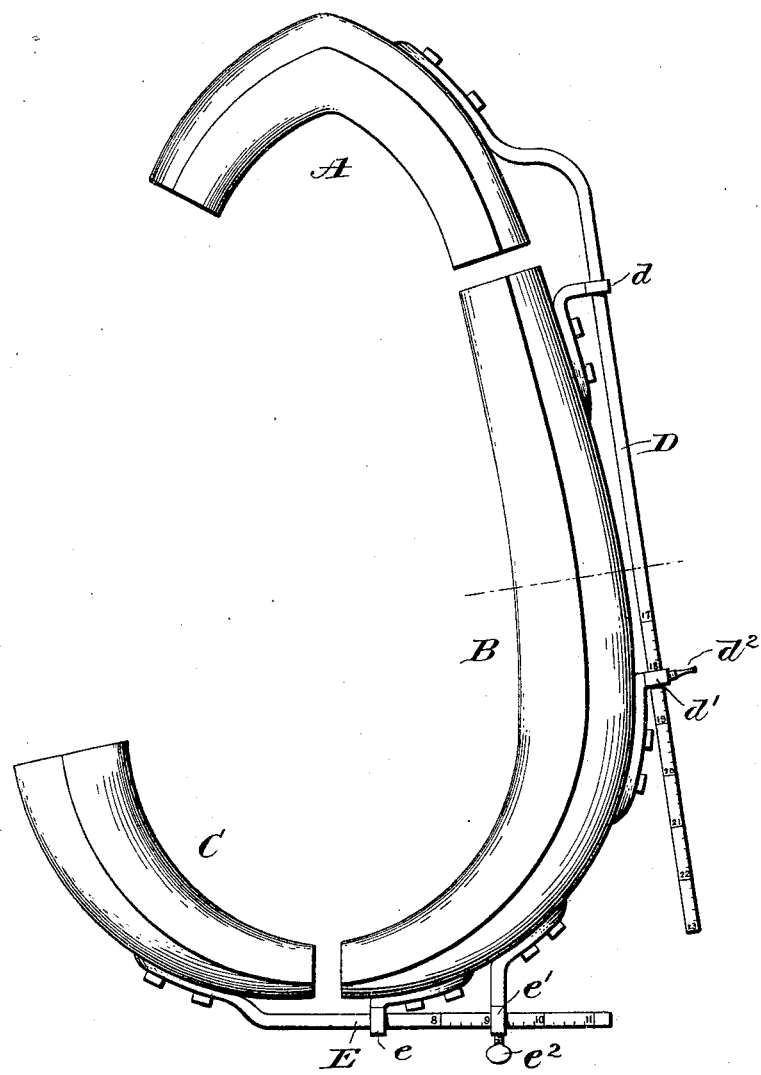
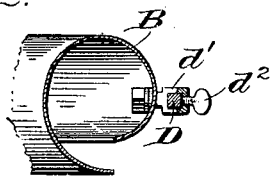

UNITED STATES PATENT OFFICE.

ALBERT JACQUOT, OF WILMINGTON, DELAWARE.

MEASURING INSTRUMENT FOR FITTING HORSE-COLLARS.

SPECIFICATION forming part of Letters Patent No. 681,553, dated August 27, 1901.

Application filed January 13, 1901. Serial No. 43,796. (No model.)

*To all whom it may concern:*

Be it known that I, ALBERT JACQUOT, of Wilmington, in the county of Newcastle, and in the State of Delaware, have invented certain new and useful Improvements in Measuring Instruments for Fitting Horse-Collars; and I do hereby declare that the following is a full, clear, and exact description thereof, reference being had to the accompanying drawings, in which—

Figure 1 is a view of a measuring instrument for fitting horse-collers, such instrument embodying my invention; and Fig. 2 is cross-section of the same on the dotted line of Fig. 1.

The object of my invention has been to produce a device by which the dimensions and shapes of properly fitting collars for horses of various sizes can be accurately determined, such device to be one which can be readily used, and in the use of which the danger of injury to the horse shall be reduced to a minimum; and to such ends my invention consists in the measuring instrument for fitting horse-collars herein specified.

In carrying my invention into practice I provide a form substantially like a horse-collar, the form being open on one side. Such form consists of a top gage A, the side gage B, and the bottom gage C. The top gage is formed like the apex of a horse-collar—viz., in an inverted substantially V shape. The side gage B corresponds in shape to a side curve and half of the bottom curve of a horse-collar, and the bottom gage C has the form of half the bottom curve of such collar. The bottom gage preferably extends up the side until its curve becomes vertical. Each of such gages is preferably formed of sheet metal bent in a form having an involute in cross-section, the ends of the gage being crossed by plane pieces of sheet metal. Such construction is light and cleanly and can be made in perfect reproduction of the shape of a horse-collar in so far as the parts which come in contact with the horse are concerned. The gages are adjustably connected together, so that they can be made to fit the necks of horses of different sizes. The connection between the top and side gages consists of a rod D, riveted or bolted to the top gage and passing through upper and lower eyes $d$ and $d'$, respectively, which are riveted or bolted to the side gage B. The rod D is bent away from the top gage far enough so that it can extend in a straight line substantially vertically outside of the gage B. The lower eye $d'$ is preferably located a considerable distance above the bottom of the gage B, and one of the eyes is provided with a thumb-nut $d^2$, so that the rod can be clamped. The rod D is graduated for the purpose of measuring the length of the neck. By placing the lower eye $d'$ above the bottom of the gage B the rod D can be made to extend below such eye to permit of adjusting the gages A and B away from each other, and the rod D can still be made short enough so that it does not extend below the gage B, and hence is guarded by such gage from doing injury to the horse. The side and bottom gages B and C are connected by a rod E, which is preferably riveted or bolted to the bottom gage and extends horizontally below the side gage B. Such rod is received in an inner and an outer eye $e$ and $e'$, respectively, on the side gage and is graduated for measuring the width of the collar. The outer eye is preferably located well under the bottom curve of the side gage B, so that the end of the rod E can extend beyond such eye a sufficient distance for all necessary adjustments for width and still not extend beyond the lateral limits of the gage B. A thumb-nut $e^2$ in the eye $e'$ serves to lock the rod E in any desired position.

In operation the rod D is, if necessary, moved vertically through the eye $d'$ to separate the gages A and B, and the rod E is, if necessary, moved laterally through the eye $e'$ to separate the gages B and C. The measuring instrument is then passed laterally over the horse's neck, the latter passing through the space between the top and bottom gages. The instrument is then supported on the horse's neck by the top gage. The thumb-nut $d^2$ is then loosened and the side gage B is raised until it properly fits the side and half of the bottom curve of the neck. The rod D is then clamped by means of the thumb-nut $d^2$. The bottom gage is then moved toward the side gage until the former properly fits the bottom and side curves of the neck and is clamped in such position by the thumb-screw $e^2$. The length of a collar which will fit the horse can then be read on the graduations on the vertical rod and the width of such collar can be read on the graduations on the horizontal rod. The gage can be removed from the horse without altering the adjustment of its parts by carrying it toward the head and then moving it laterally.

Having thus described my invention, what I claim is—

1. In a measuring instrument for fitting horse-collars, the combination with a V-shaped top collar-section, of a side collar-section, a scale-rod attached to such top section and extended substantially tangentially to the upper portion of the side collar-section, eyes on the said side section adapted to receive such rod, said eyes being located nearer the top section than the opposite extremity of the bottom section by a distance equal at least to the extreme limit of adjustment on said rod, and a thumb-screw on one of the eyes for clamping the rod, substantially as and for the purpose described.

2. In a measuring instrument for fitting horse-collars, the combination with a V-shaped top collar-section, a side collar-section, and a bottom collar-section, a scale-rod attached to such top section and extended substantially tangentially to the upper portion of the side collar-section, eyes on said side section adapted to receive such rod, and located above the lower extremity of said side section, a scale-rod attached to such bottom section and extended substantially parallel to the minor axis of the instrument, and eyes on said side section adapted to receive such last-mentioned scale-rod, said eyes being located nearer such bottom section than the lateral limits of said side section by a distance equal at least to the extreme limit of adjustment on said rod, substantially as and for the purpose described.

3. In a measuring instrument for fitting horse-collars, the combination with a V-shaped top collar-section, of a single middle collar-section forming substantially a side and half of the bottom of the collar-form, and a bottom collar-section forming substantially half of the bottom of the collar-form, means for supporting said bottom collar-section from said middle collar-section, and for adjusting said bottom section substantially horizontally toward and away from said middle section independently of any vertical movement between such sections and means for adjusting said top section in a line that is oblique to the line of adjustment of the bottom section, substantially as and for the purpose described.

In testimony that I claim the foregoing I have hereunto set my hand this 14th day of January, A. D. 1901.

ALBERT JACQUOT.

Witnesses:
 THOMAS FERRY,
 WILBUR L. SASSE.